(12) United States Patent
Crosby et al.

(10) Patent No.: US 8,717,759 B2
(45) Date of Patent: May 6, 2014

(54) APPARATUS AND METHOD FOR TRANSFORMING A CONSUMER DEVICE ENCLOSURE

(75) Inventors: Ben Crosby, Murphy, TX (US); Sheldon George Phillips, Thousand Oaks, CA (US); Michael Hee-cheol Kim, Valencia, CA (US); Timothy Alan Barrett, Pymble (AU)

(73) Assignee: Thomson Licensing, Issy-Moulineaux (FR)

( * ) Notice: Subject to any disclaimer, the term of this patent is extended or adjusted under 35 U.S.C. 154(b) by 0 days.

(21) Appl. No.: 13/522,879

(22) PCT Filed: Dec. 9, 2010

(86) PCT No.: PCT/US2010/059647
§ 371 (c)(1),
(2), (4) Date: Jul. 18, 2012

(87) PCT Pub. No.: WO2011/093951
PCT Pub. Date: Aug. 4, 2011

(65) Prior Publication Data
US 2012/0290748 A1   Nov. 15, 2012

Related U.S. Application Data

(60) Provisional application No. 61/300,256, filed on Feb. 1, 2010.

(51) Int. Cl.
*H05K 7/20* (2006.01)
(52) U.S. Cl.
USPC ............................................ 361/688; 710/26
(58) Field of Classification Search
None
See application file for complete search history.

(56) References Cited

U.S. PATENT DOCUMENTS

| | | | | |
|---|---|---|---|---|
| 5,218,514 A | * | 6/1993 | Huynh et al. | 361/679.47 |
| 5,375,038 A | * | 12/1994 | Hardt | 361/694 |
| 5,813,243 A | * | 9/1998 | Johnson et al. | 62/259.2 |
| 5,949,646 A | * | 9/1999 | Lee et al. | 361/695 |
| 6,113,485 A | * | 9/2000 | Marquis et al. | 454/184 |
| 7,857,688 B1 | * | 12/2010 | Cunningham et al. | 454/184 |
| 7,990,700 B2 | * | 8/2011 | Guo | 361/679.48 |
| 2008/0002358 A1 | * | 1/2008 | Casebolt | 361/687 |
| 2008/0113603 A1 | * | 5/2008 | Atallah | 454/184 |
| 2009/0052296 A1 | * | 2/2009 | Tracy et al. | 369/75.11 |

FOREIGN PATENT DOCUMENTS

| | | |
|---|---|---|
| EP | 1947650 | 7/2008 |
| WO | WO2009015082 | 1/2009 |

OTHER PUBLICATIONS

International Search Report dated Apr. 19, 2011.

* cited by examiner

*Primary Examiner* — Elias Mamo
(74) *Attorney, Agent, or Firm* — Robert D. Shedd; Vincent E. Duffy; Michael A. Pugel

(57) ABSTRACT

A transformable enclosure enabling increased functionality, such as storage capacity, is provided. The apparatus enables modular units to be attached to increase capacity without compromising the integrity of the overall structure. The apparatus includes a housing that contains a signal processing circuit, the housing including interfaces for coupling a plurality of removable modules to the circuit, a base coupled to the housing that supports the housing in at least two orientations. The apparatus operates in a first mechanical orientation without the plurality of removable modules coupled to the interfaces and operates in a second mechanical orientation with the plurality of removable modules coupled to the interfaces. A cooling device provides cooling for the circuit in the first mechanical orientation and the plurality of removable modules in the second mechanical orientation.

20 Claims, 6 Drawing Sheets

APPARATUS AND METHOD FOR TRANSFORMING A CONSUMER DEVICE ENCLOSURE

REFERENCE TO RELATED PROVISIONAL APPLICATIONS

This application claims the benefit, under 35 U.S.C. §365 of International Application PCT/US10/059,647, filed Dec. 9, 2010, which was published in accordance with PCT Article 21(2) on Aug. 4, 2011 in English and which claims the benefit of U.S. provisional patent application No. 61/300,256, filed Feb. 1, 2010.

TECHNICAL FIELD OF THE INVENTION

The present disclosure generally relates to digital content systems and content delivery devices and more particularly to a transformable consumer device or apparatus enclosure enabling additional modules to be added to the device to increase functionality, such as storage capacity.

BACKGROUND OF THE INVENTION

Storage in the form of hard disks is now required in a range of consumer devices from networking devices such as residential gateways to media products such as digital video recorders (DVRs) and media players. In many instances, such as in a residential gateway, for example, storage may be a desirable option, though for reasons of cost, the unit would need to be shipped without it, with a potential option to be added on later. Today, this would be done with an external drive such as a Universal Serial Bus (USB) drive, though this option has performance limitations and requires a separate unit and possibly a cable to connect the drive. An additional issue is how the unit could later support more sophisticated storage (such as a Redundant Array of Inexpensive Disks (RAID)). Further, adding additional functionality, such as storage, internal to a consumer device, may create operational issues, such as excessive heat generation.

Therefore, a need exists for techniques for transforming or configuring enclosures of consumer devices to enable modular units to be attached to increase functionality, such as storage capacity, by the addition of modules, without compromising the integrity of the overall structure and performance, including the industrial design integrity.

SUMMARY

A transformable device enclosure enabling increased functionality is provided.

According to one aspect of the present disclosure, an apparatus is provided including a signal processing circuit, the signal processing circuit receiving a data signal containing at least one of an audio program stream and a video program stream and outputting the at least one of an audio program stream and a video program stream for display, and an interface that communicatively couples at least one removable device to the signal processing circuit, wherein the apparatus operates in a first mechanical orientation without the at least one removable device coupled to the interface and operates in a second mechanical orientation with the at least one removable device coupled to the interface.

In another aspect of the present disclosure, in an apparatus that operates in a first mechanical orientation without a plurality of removable devices and operates in a second mechanical orientation with the plurality of removable devices, a method is provided including positioning the apparatus in the first mechanical orientation, processing a (304) a data signal received by the apparatus, the data signal containing at least one of an audio program stream and a video program stream, positioning the apparatus in the second mechanical orientation, and coupling at least one of the plurality of removable devices to the signal processing circuit when in the second mechanical orientation.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1A:
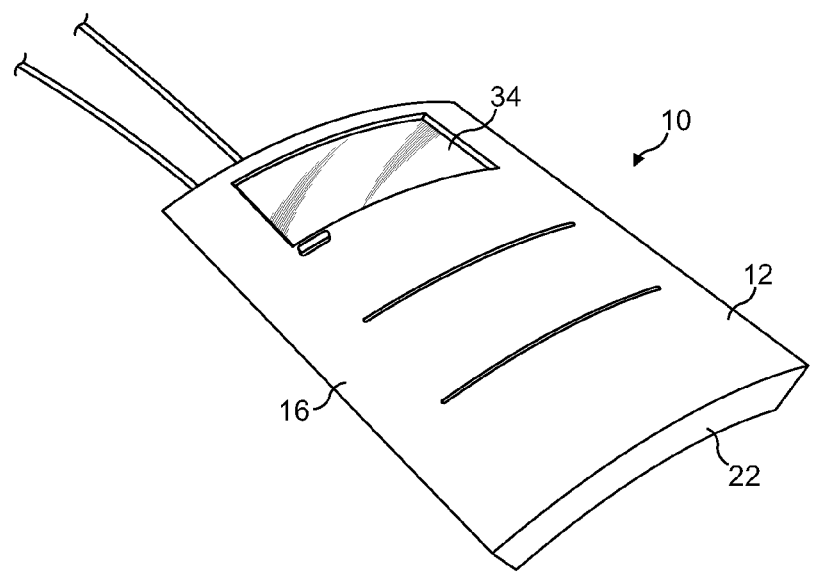
FIG. 1*a* is a perspective view of a transformable enclosure in a first orientation in accordance with the present disclosure.

It should be understood that the drawings are for purposes of illustrating the concepts of the disclosure and are not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure addresses at least the above-described problems by providing a mechanism for a device to be deployed in a simple, base form, and may be easily augmented by the customer at a later date. While consumer devices and storage may be described here as one set of embodiments, the mechanism is much more flexible and may apply to a wide range of upgrade options such as random access memory (RAM), input/output (I/O) capability (i.e. ports and interfaces such as a Universal Serial Bus (USB) interface, memory card slots, etc), cooling, wireless interface modules, network interface modules, and the like.

The present disclosure relates to an efficient mechanical arrangement which allows a settop or gateway type device to expand to include multiple storage devices (e.g., hard disk drives) or other modular components while still maintaining a look and feel of the original configuration and also manage the change in power consumption/heat generation. In a first orientation, only the settop or gateway device is present as a stand-alone device, without additional modules. In a second orientation, the device portion of the housing flips up, or rotates, to facilitate the connection of multiple storage drives (preferably in a Redundant Array of Inexpensive Disks (RAID) configuration) or other modular components. The settop or gateway device may be designed to be cooled in the first orientation, i.e., without the storage drives, and the same device is cooled in the second orientation in a manner that minimizes the effect, particularly with respect to thermal performance, of the presence of the multiple storage drives. In general, the first orientation is disposed horizontally containing the settop or gateway device, and may be cooled with fan forced cooling or convection air flow cooling of the device. The second orientation disposed vertically with convection cooling for the settop or gateway device, while a portion of the structure, including, for instance, one or more fans, remains horizontal and is now used to cool the multiple storage drives or stacked components as well as the settop or gateway device.

Figure 1B:
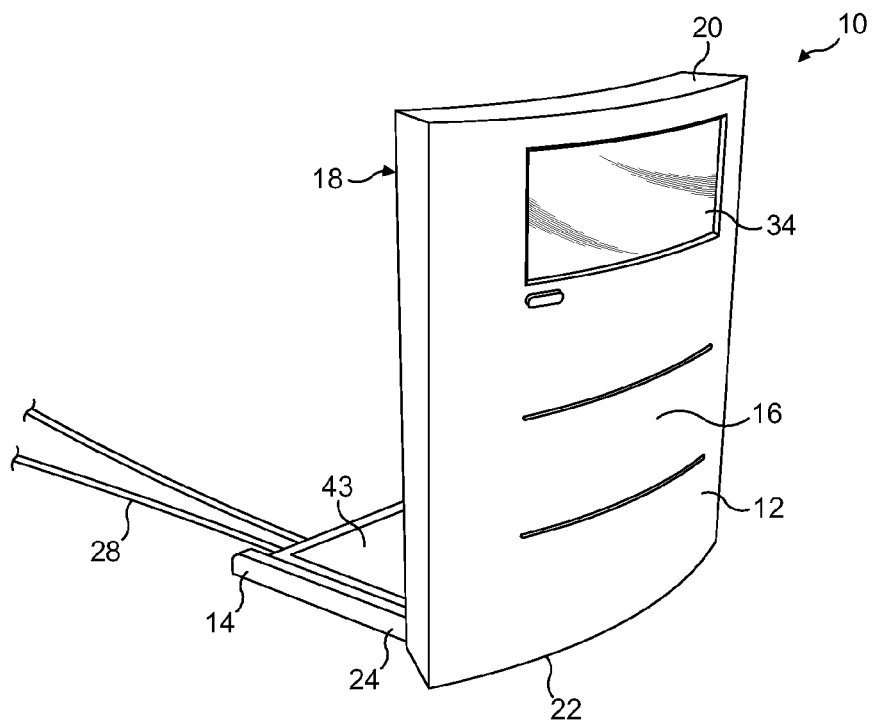
FIG. 1*b* is a perspective view of a transformable enclosure in a second orientation in accordance with the present disclosure.

The embodiments within this disclosure define a transformable enclosure 10 for devices, enabling modular units to be attached to, for example, increase storage capacity without compromising industrial design integrity. A transformable enclosure may be used in conjunction with various consumer devices, such as, but not limited to gateways, settop boxes, media players, compact disk or digital versatile disk players, game consoles, computers, and the like. FIGS. 1a and 1b illustrate one instantiation of a device 10 of the present disclosure. The device 10 includes a main body or housing 12 and a base 14 for supporting the housing 12 in at least two orientations. The housing 12 includes the main electronic circuitry for device 10 and may include circuitry to operate as a settop box, gateway, media player, or any other similar electronic consumer related device. The generally rectangular housing 12 includes a front face 16, a rear face 18, a top portion 20 and a bottom portion 22. The bottom portion 22 is hingedly coupled to a first end 24 of the base 14. A second end 26 of the base 14 is configured to allow one or more cables 28, such as a power cable internet cable, Ethernet cable, or Radio Frequency (RF) coaxial cable, to be coupled to device 10. A display 34 is also provided for status or user interface control.

Figure 4:
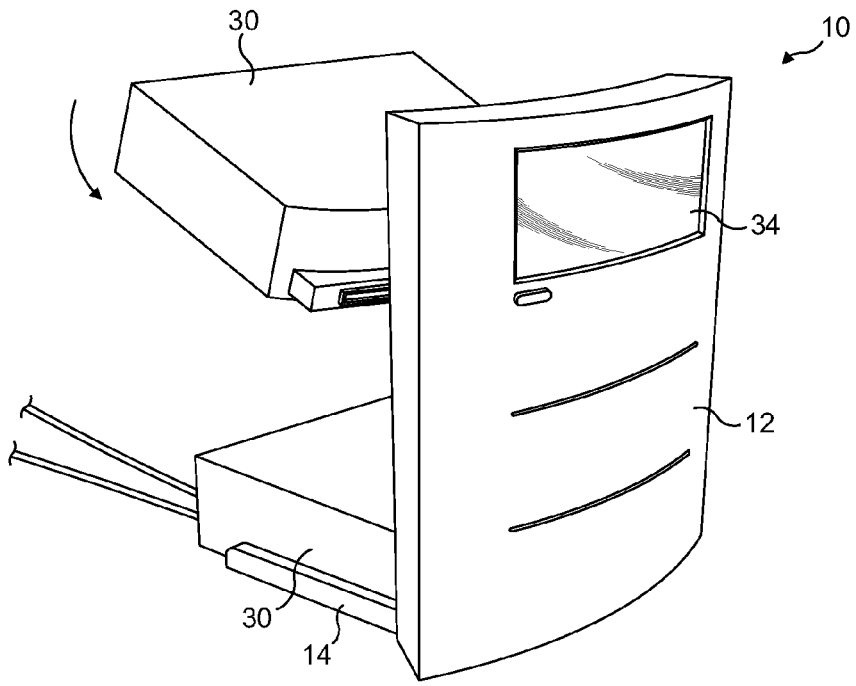
FIG. 4 illustrates a storage module being coupled to a transformable enclosure in accordance with the present disclosure.
Figure 5:
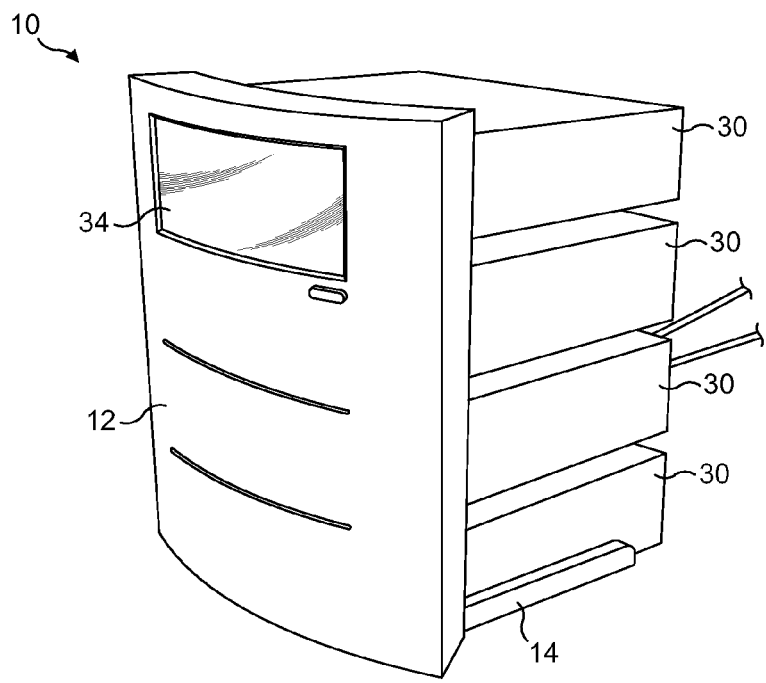
FIG. 5 illustrates a transformable enclosure with four (4) storage modules in accordance with the present disclosure.

As shown in FIG. 1a, the housing 12 is folded upon the base 14 in a first mechanical orientation. In this first orientation, the device 10 will have minimal storage capacity and in certain embodiments may operate as a gateway, cable modem, etc. As shown in FIG. 1b, the main body 12 of the device 10 has a capability to be folded, flipped, or rotated, up and out from the base 14 at an approximately 90 degree angle in a second mechanical orientation, allowing removable modules (not shown) to be inserted into the back of the main body 12 as shown in FIGS. 4 and 5 and described in further detail below.

The device 10 is configured in such a way that it may function with or without modular units. Wired connectivity to the device may be channeled, or electro-mechanically coupled, through the articulated frame support that enables multiple positioning of the main body 12 of device, with the main body containing a plurality of receiver features that physically and electrically interconnect with modular units. The configuration with the modular units will be described in more detail below.

In certain embodiments, the device 10 may also include a user interface. In one embodiment, interface and control of device is facilitated through an integrated display and/or touchscreen device 34 on main body 12, and/or through the use of a remote control, as will be described below in relation to FIG. 6. In other embodiments, the device 10 may be managed purely through a remote interface via Ethernet and, in this instance, the interface and control could be provided remotely or locally through an interface on an optional module. Regardless of the module configuration, the overall aesthetic integrity of the enclosure is maintained in all conditions, whether used singularly without modules, or with any number of modules installed and regardless of the module type.

Figure 2:
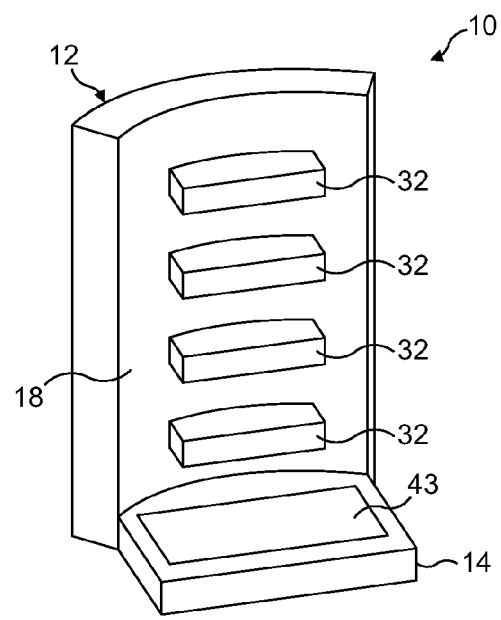
FIG. 2 is a perspective rear view of an embodiment of a transformable enclosure in the second orientation in accordance with the present disclosure.

Turning to FIG. 2, a perspective rear view of an embodiment of the device 10 according to aspects of the present disclosure is shown. Modular connectors 32 are provided on the rear face 18 of the housing 12 and are designed to support modules containing hard disks or other types of modular components. In one embodiment, the connectors may be purpose built for the attachment and inclusion of explicit modules, such as storage in the form of a hard drive or other types of modules such as additional network technologies. The modules may be a fixed size and spacing facilitating a uniform and fixed positioning for the modular connectors 32. As a result, the connectors 32 are fixed in position on the rear face 18 of housing 12. The device 10 will accept modules of a predetermined size.

The embodiment may also include additional, more general interfaces, such as a Universal Serial Bus (USB) interface. Still other embodiments may include a multi-purpose connector to allow a wide range of module functionality. It is important to note that one embodiment may include a combination of the above and may include certain interfaces in certain positions, in order to provide maximum flexibility.

The modular connectors 32 may be configured as any known type of interface. For example, one of the modular connectors 32 may be a (single or multiple) multi-pin I/O interface that may contain any combination of data and/or power, such as a Peripheral Component Interconnect (PCI) interface, a Universal Serial Bus (USB) interface, an Integrated Drive Electronics (IDE) interface, a FireWire interface, a Serial Advanced Technology Attachment plus power (SATA+power) interface, USB3+Power interface, SATA+USB+Power interface, etc. The connectors may include complex signaling such as Low-voltage Differential Signaling (LVDS) or Peripheral Component Interconnect express (PCI-Express or PCI-E) schemes. The modular connectors 32 may be proprietary or standardized.

Figure 3:
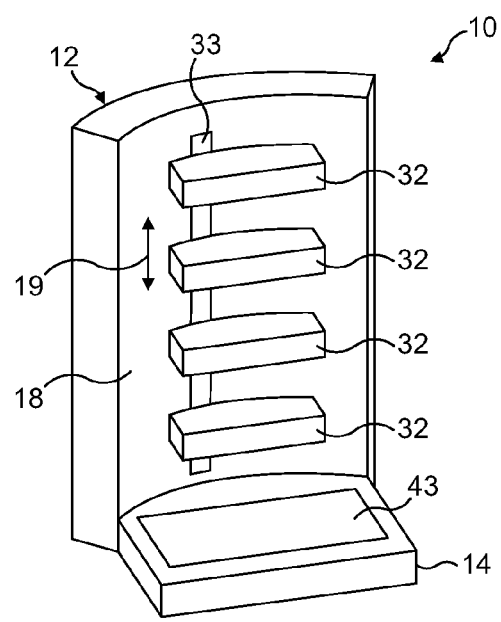
FIG. 3 is a perspective rear view of another embodiment of a transformable enclosure in the second orientation in accordance with another embodiment of the present disclosure.

Turning to FIG. 3, a perspective rear view of another embodiment of the device 10 according to aspects of the present disclosure is shown. The modular connectors 32 are intended to support a plurality of modules of different types and sizes, including, for example, half height or half width modules, and dummy modules where necessary. The modular connectors 32 are repositionable to accept modules of varying height. The device 10 includes a communication bus 33 disposed on the rear face 18 of the housing 12. The connectors 32 are configured to be slidingly engagable with the bus 33 to allow movement of the connectors up or down as indicated by arrow 19. In this embodiment, the connectors 32 may be positioned in various locations along the bus 33, i.e., the height of the housing 12, to accommodate modules of varying height.

Turning now to FIG. 4, a side view of an embodiment of the device 10 showing at least one module 30 according to aspects of the present disclosure is shown. FIG. 4 illustrates the plug in feature of the module 30 attaching to one of the connectors (not shown) located on the rear face of the housing 12. It is important to note that the first module 30 may be positioned in the lowest position located on top of the base 14. Each additional module 30 may be located in the next position upward.

Turning now to FIG. 5, a side view of an embodiment of the device 10 showing four modules 30 according to aspects of the present disclosure is shown. FIG. 5 shows the position of the four modules 30 attached to the rear face of housing 12. It is important to note that more than four modules 30 may be accommodated and that each module 30 may not be uniform in size and dimension, as described above in FIG. 3.

Figure 6:
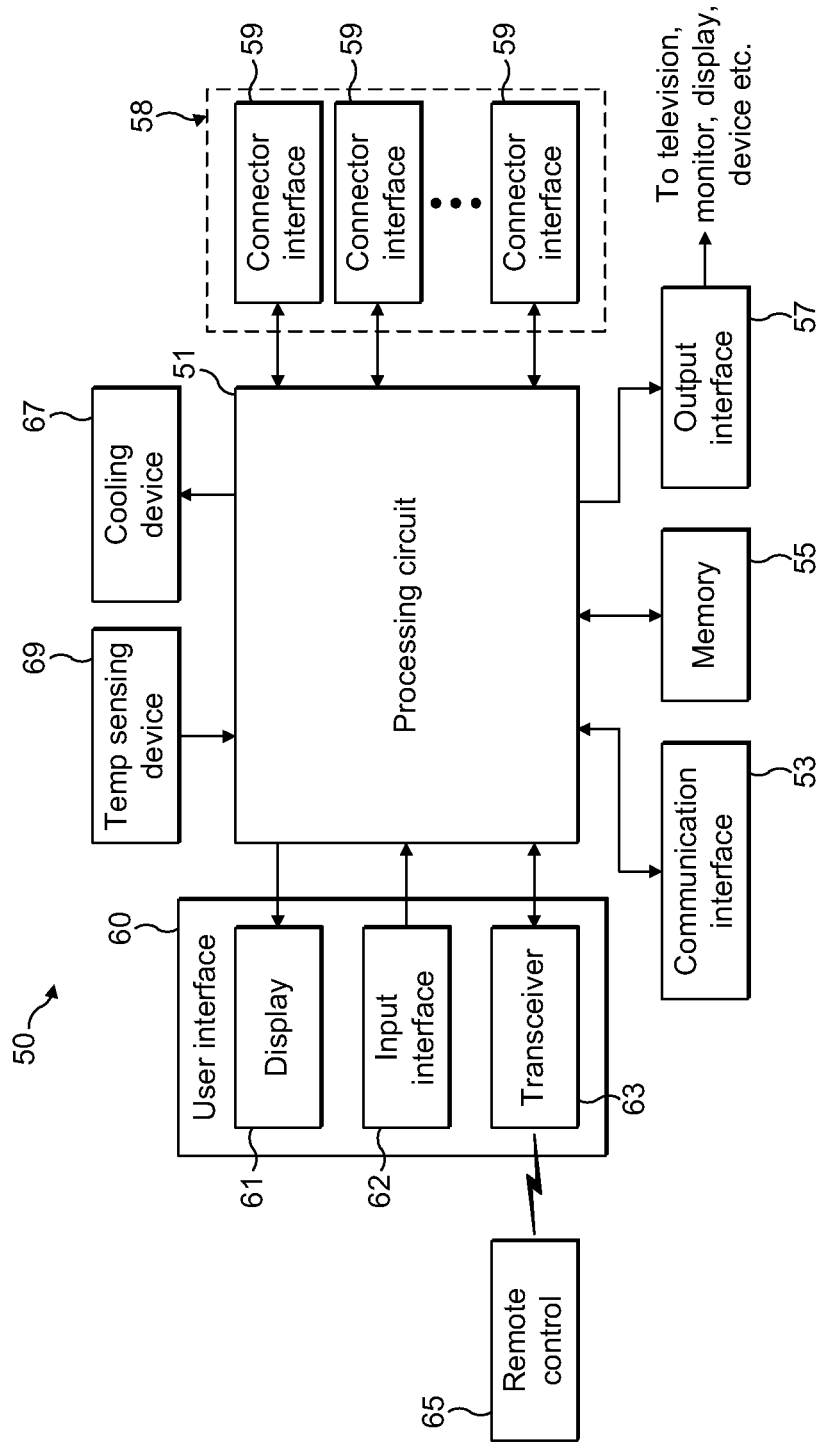
FIG. 6 is a block diagram of a circuit used in a transformable enclosure in accordance with the present disclosure.

Referring to FIG. 6, a block diagram of an embodiment of an electronic circuit 50 included in the transformable enclosure of the present disclosure is illustrated. The device 50 includes a signal processing circuit 51. Signal processing circuit 51 may be an integrated microcontroller capable of receiving a data signal via a communication interface 53. The data signal may contain at least one of an audio program stream and a video program stream. Signal processing circuit 51 further processes the data signal and outputs the at least one of an audio program stream and a video program stream for display via output interface 57. Signal processing circuit may include audio and video decoding circuits and data stream parsing circuits for managing data traffic between the various blocks in circuit 50. The communication interface 53 may be one of several known receiver circuits used for receiving, demodulation, and decoding signals provided over one of the several possible networks including over the air, cable, satellite, Ethernet, fiber and phone line networks. The output interface 57 may include various audio and/or display interfaces either in analog and/or digital format. The audio interface may provide a digital signal to an audio output device or display device using a High-Definition Multimedia Interface (HDMI) cable or alternate audio interface such as via a Sony/Philips Digital Interconnect Format (SPDIF). The display interface may be an analog signal interface such as red-green-blue (RGB) or may be a digital interface such as high definition multimedia interface (HDMI).

The signal processing circuit 51 is further coupled to memory 55 (e.g., volatile or non-volatile memory, including random access memory (RAM), static RAM, dynamic RAM, read only memory (ROM), programmable ROM, flash memory, electronically programmable ROM, electronically erasable programmable ROM, etc.) for storing information and instruction code for signal processing circuit 51. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

At least one module interface 631 is provided for communicatively coupling a plurality of removable modules or storage devices, e.g., modules 30 as shown in FIGS. 4 and 5, to the signal processing circuit 51, wherein the device 50 operates in a first mechanical orientation without the plurality of removable modules coupled to the module interface 58 and operates in a second mechanical orientation with the plurality of removable modules coupled to the module interface 58. The module interface 58 includes one or more connector interfaces 59, which are disposed on a housing for device 50, such as the rear face 18 of housing 14 described in FIGS. 1-5.

A user interface 60 is provided for controlling the device and for navigating content stored in memory 55 or on any one of the modules. In certain embodiments, the user interface 60 will include a display 61 for displaying parameters and content to a user. The user interface 60 will also include an input interface 62 for enabling the user to input, for example, commands, search queries, etc. The input interface 62 may be in the form of switches, buttons, a touchscreen, etc. Furthermore, a transceiver 63 may be provided to enable user control via a remote control device 65. In one embodiment, a touch panel device is provided as part of the remote control device 65 which allows operation of the device 50 based on hand movements, or gestures, and actions translated through the panel into commands In another embodiment, the touch panel will additionally serve as a display device allowing the user to more directly interact with the removable modules coupled to the device 50. Alternatively, the remote control device 65 may be a mouse device, a remote control with navigation features, or a gesture based remote control, for example, employing accelerometers and/or gyroscopes.

The device 50 may also include external networking interface capability via communication interface 53. In one embodiment, the device may be a residential gateway. The device may be used to terminate a network service into the home. Modules may be added to support new WAN network interfaces allowing migration from Asymmetrical Digital Subscriber Line (ADSL) to ADSL2+, Very High Bit Rate Digital Subscriber Line (VDSL), or Fiber in the Home (FTTH). Additionally, the Home networking side of the device may allow multiple additional home networking technologies to be added as required in a modular fashion to allow the device to support technologies such as Home Phoneline Network Alliance (HPNA), Multimedia over Cable Alliance (MoCA), HomePlug Audio Visual (AV), the emerging international standard known as G.hn, and potentially other future networking technologies that don't exist today. As a result, the device may be expandable and adaptable to service the home over a wider range of current and emerging technologies.

The device 50 may also include integrated software, stored in memory 55, to operate both as a stand-alone device and as a device integrated with one or more modules. In one embodiment, the software architecture of the device may also be configured in a modular fashion, where support for a module and/or additional functionality associated with that module could be easily and dynamically loaded. The software could either be loaded off the module itself, or via the network, triggered by the insertion of the module. The device 50 may immediately recognize connected modules, and enable appropriate configuration options based on these recognized modules. As an example, when a device with a single disk module has a second disk module added, configuration options for RAID 0 (disk striping) and RAID 1 (disk mirroring) would automatically become available. This may also apply to network stacks, low level drivers and protocols that may be required for module operation. The modular software architecture would also allow additional functionality to be added to the device independent of any module.

In one embodiment, cooling for device 50 may be accomplished through an air convection system. The housing for device 50 may include ducts or ports in the housing to allow airflow through the housing when the housing is disposed in more than one mechanical configuration, such as both a horizontal and vertical orientation. The housing may also permit convection airflow through or across one or more modules attached to the housing.

In a further embodiment, the device 50 may include a cooling mechanism. A cooling device 67 is provided in a base portion of the housing, such as base 14 described in FIGS. 1-5. The cooling device 67 may include any known cooling mechanism such as a fan, a liquid cooled device or a combination thereof. By disposing the cooling device 67 in the base, the cooling device 67 will provide for cooling the signal processing circuit 51 as well as the remaining portion of device 50 in the first mechanical orientation. In this first orientation, the housing is folded over and the signal processing circuit 51 contained within the housing is arranged approximately over the cooling device 67. Cooling device 67 also provides cooling to signal processing circuit 51 and the remaining portion of device 50 and in addition provides cooling to the plurality of removable modules attached to the housing in the second orientation. When in the second orientation, as modules are coupled to the housing, as shown in FIGS. 4 and 5, the modules will be arranged approximately over the cooling device 67. It is important to note that in the second orientation, cooling from the cooling device 67 provided to the signal processing circuit 51 and the remaining portion of device 50 may be reduced. The second orientation may allow the housing to provide alternative cooling, such as convection air cooling.

As shown in FIG. 6, the cooling device 67 is under control of the signal processing circuit 51. In certain embodiments, the cooling device may always be activated. In other embodiments, the cooling device 67 may be activated and deactivated based on a temperature sensed by temperature sensing device 69.

Figure 7A:
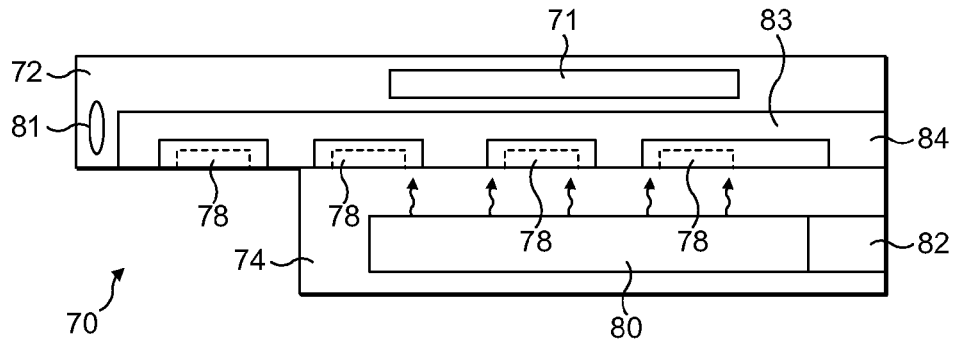
FIG. 7*a* is a side view of a transformable enclosure employing a cooling mechanism in a first orientation in accordance with the present disclosure.
Figure 7B:
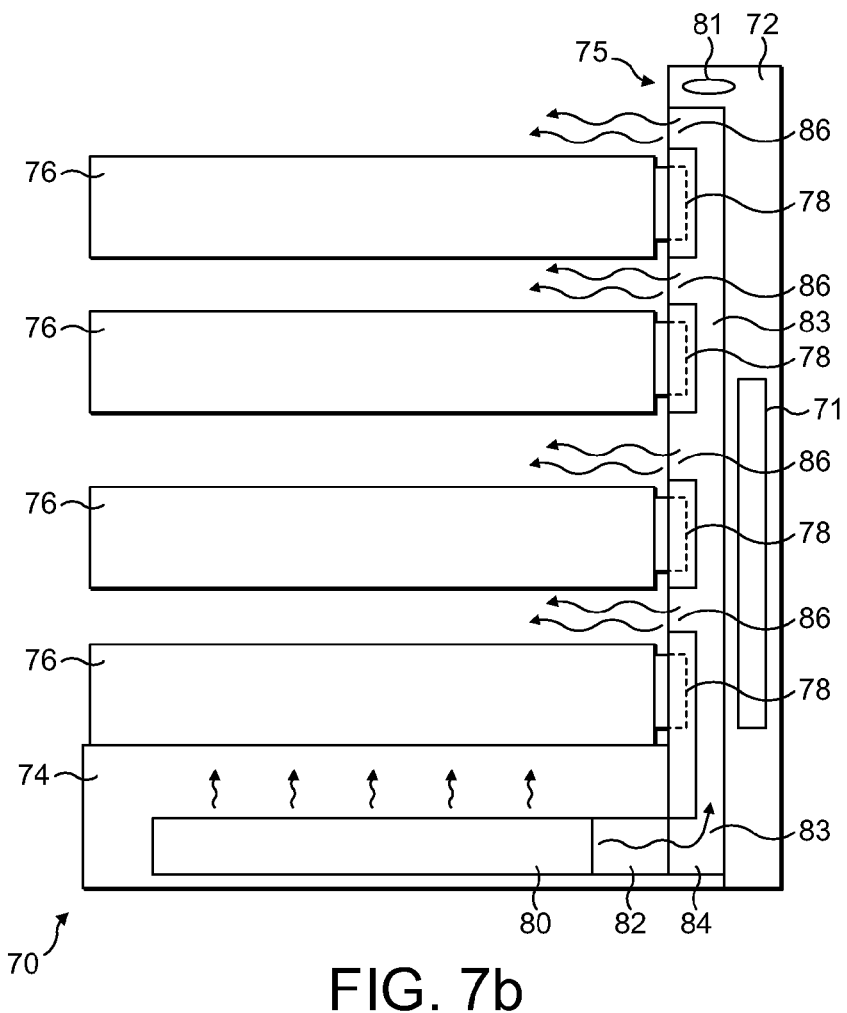
FIG. 7*b* is a side view of the transformable enclosure shown in FIG. 7*a* in a second orientation in accordance with the present disclosure.

Referring to FIGS. 7a and 7b, an embodiment of cooling mechanism in a transformable enclosure according to aspects of the present disclosure is illustrated. FIG. 7a is a cross sectional view of a device 70 in a first orientation with the housing 72 and base 714 in the horizontal position. In this embodiment, the cooling device 80 is disposed in the base 714 and configured to direct cooling air in a perpendicular direction relative to the base 714 as indicated by the arrows. When the housing 72 is folded over the base 74, the electronic circuit 71 is positioned approximately over the cooling device 80 to receive the cooling air. The base 74 includes a first, lower duct portion 82 which couples the cooling device 80 to an upper duct portion 83 disposed in the housing 72. The upper duct portion 83 includes a second lower duct portion 84 which couples the upper duct portion 83 to the cooling device 80 when the device 70 is in the second orientation as will be described in relation to FIG. 7b.

FIG. 7b is a cross sectional view of the device 70 in a second orientation. The housing 72 is moved into an upright position to enable the housing 72 and device 70 to receive modules 76. The modules 76 mate to connectors 78. The connectors 78 are further coupled to the circuit 71 in order to permit data and other communications signaling between circuit 71 and modules 76. In the second orientation, the first lower duct portion 82 and the second lower duct portion 84 mate and/or couple together to direct air flow from the cooling device 80 to the upper duct portion 83 as indicated by arrow 85. A plurality of openings 86 are arranged in the upper duct portion 83, along the rear face 75 of the housing 74. Cooling air from the openings 86 is discharged from the upper duct portion 83 across a surface of each of the modules 76. In FIG. 7b, the openings 86 are arranged adjacent to the connectors 78 disposed on the rear face 75 of the housing 72. It is to be appreciated that the position of the openings 86 is not limited to that shown in FIG. 7b and may be arranged in other positions on the rear face 75 of the housing 72.

In one embodiment, a temperature sensing device 81 is disposed in the housing 72 to modulate the cooling device 80 on and off to maintain a predetermined temperature. In another embodiment, the cooling device 80 is a variable speed fan where the speed of the fan is varied to maintain a predetermined temperature as sensed by the temperature sensing device 81. It is to be appreciated that the temperature sensing device 81 may be any known temperature sensing device including but not limited to a resistance temperature detector (RTD) sensor, a thermistor, a thermocouple, a temperature switch, a chip-based temperature sensor, etc.

In yet another embodiment, the cooling device 80 is multi-stage cooling device where as a number of cooling stages is activated, the cooling capacity of the device increases. In this embodiment, the stages of cooling may be activated based on the number of modules 76 disposed in the device 70. For example, if two modules 76 are coupled to device 70 and device 70 has the capacity to receive four modules, i.e., the device is at 50 percent load, a number of stages would be activated to achieve 50 percent cooling of the total capacity of the cooling device 80. In this example, if the cooling device is a four stage device, two stages of cooling would be activated when two modules 76 are loaded into the device 70.

Although the above embodiments describe the cooling device as a fan, other types of cooling devices are contemplated by the present disclosure including but not limited to liquid cooling devices, passive or active heat-sink cooling devices, phase-change cooling devices, etc. For example, a liquid-cooled system may include a pump for moving coolant through the system, a radiator for dispelling heat into the air, a fan for moving air over the radiator, a coolant reservoir and a plurality of hoses to move the coolant through the system. In one embodiment, all the components of the liquid-cooled system are disposed in the base 74. In another embodiment, the pump, radiator and coolant reservoir may be disposed in the base 74 with at least one radiator and fan disposed in the housing 72. Flexible tubing will couple the components in the base to the at least one fan and radiator to enable the device 70 to freely be positioned from the first orientation to the second orientation.

It should be further appreciated that any of the above-described embodiments of a cooling device, such as cooling device 80 may be employed within a housing, such as housing 72, without any component of the cooling device or system disposed in a base, such as base 74.

Figure 8:
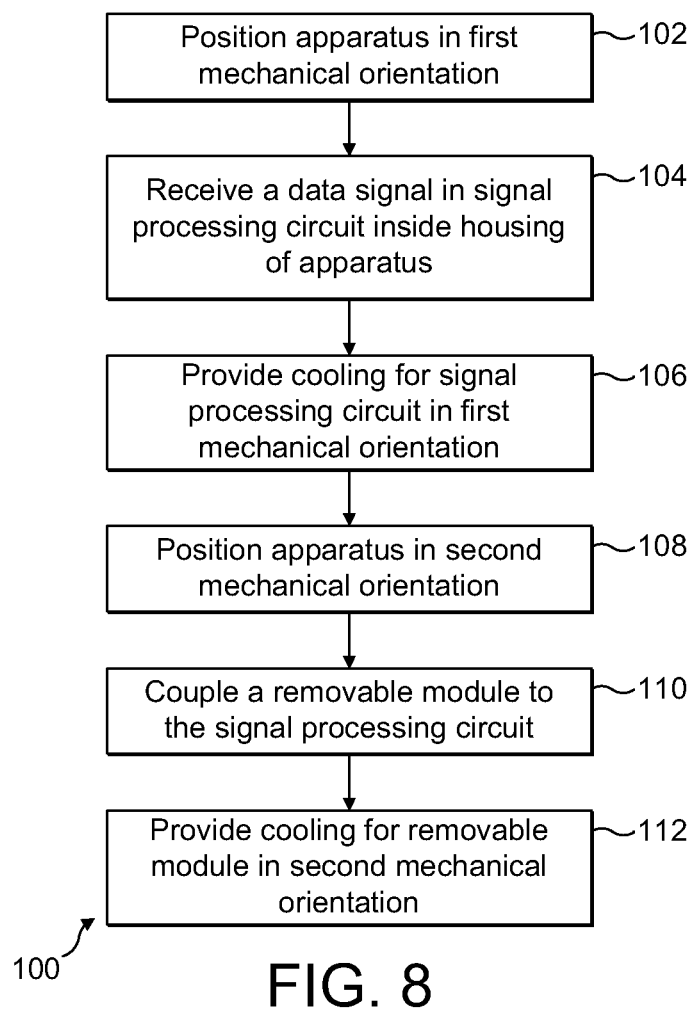
FIG. 8 is a flow chart illustrating a process for operating the transformable enclosure in accordance with the present disclosure.

Referring to FIG. 8, a flow chart illustrating a process 100 for operating the transformable enclosure consumer device is provided. Process 100 will be primarily described with respect to the device 70 described in FIGS. 7a and 7b. It should be noted that process 100 may equally apply to device 10 described in FIGS. 1-5. At step 102, the device or apparatus 70 is positioned in the first mechanical orientation, e.g., a horizontal mechanical orientation. As shown in FIG. 7a, the first mechanical position includes the housing 72 folded upon the base 74. In this position, the device 70 may operate as a settop box, a cable modem, gateway, etc. Device 70 operates without the addition of any removable modules. At step 104, a signal is received by the device 70. The signal may be a data signal containing at least one of an audio program stream and a video program stream and received by a circuit 71 disposed in the device 70. The data signal may be processed and output as at least one of an audio program stream and a video program stream for display. At step 106, the cooling device 80 provides cooling for the circuits, including the circuit 71 disposed in the housing 72. Housing 72 is folded over the base 74 arranging the circuit 71 in close proximity to the cooling device 80.

Next, at step 108, the device 70 is positioned in a second mechanical orientation. As shown in FIG. 7b, the housing 72 is positioned at approximately 90 degrees relative to the base 74. At step 110, at least one removable module 76 is coupled to the interface or connectors 78 disposed on the rear face 75 of the housing 72. At step 112, the cooling device 80 provides cooling for the removable modules 76 in the second mechanical orientation. Cooling for the circuit 71 may also be provided as a secondary measure by the cooling device 80. Circuit 71, in its second orientation, may also be cooled by a second measure, such as by convection air flow. It is important to note that depending on the number of removable devices coupled to the apparatus, a position of at least one removable device may be varied in the second mechanical orientation. Further, depending on the number of modules 76 attached to housing 72, the provided cooling may be variable or adjustable and may also be controlled by a temperature sensor device, such as temperature sensor 81.

The present disclosure describes a transformable enclosure for a device, such as a media device, player, or control center. The device includes the capability to include one or more expansion modules, while still maintaining an overall desirable operation and structure. The device is configured such that the device may function electrically and mechanically, with or without the modules. Connectivity, and in particular wired connectivity, between the device and one or more of the modules, is provided through an articulated frame support that enables multiple positioning of the device structure. The device includes structures for interfacing with one or more possible physical interconnection systems. The device may also include an integrated display, such as a touch screen liquid crystal display (LCD) panel or the like, and may also be operated through a remote control and remote interface. The device and any included modules, may maintain a predominant structural and aesthetic feature established by the device itself. As a result, the overall aesthetic and structural features may be maintained in all configuration conditions, whether used without additional modules, or used with any number of, or all possible, modules installed.

Although embodiments which incorporates the teachings of the present disclosure have been shown and described in detail herein, those skilled in the art can readily devise many other varied embodiments that still incorporate these teachings. Having described preferred embodiments of a transformable enclosure consumer device enabling increased storage capacity (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:
1. An apparatus comprising:
a housing, the housing including:
a signal processing circuit, the signal processing circuit receiving a data signal containing a program stream and outputting the program stream; and
an interface that communicatively couples at least one removable device to the signal processing circuit, wherein the apparatus operates in a first mechanical orientation without the at least one removable device coupled to the interface and operates in a second mechanical orientation with the at least one removable device coupled to the interface; and a base, the base including a cooling unit, the cooling unit providing cooling to the signal processing circuit in the housing through a duct in the base and a first duct in the housing that are coupled to direct air flow from the base to the housing in the first mechanical orientation and for providing cooling to the at least one removable device through the duct in the base and a second duct and the first duct in the housing that are coupled to direct air flow from the base to the housing in the second mechanical orientation, wherein the orientation of the housing in the first mechanical orientation is orthogonal to the orientation of the housing in the second mechanical orientation.

2. The apparatus of claim 1 wherein the housing is horizontal in the first mechanical orientation.

3. The apparatus of claim 1, wherein the at least one removable device is a hard disk drive.

4. The apparatus of claim 3, wherein the hard disk drive is a redundant array of inexpensive disks (RAID) drive.

5. The apparatus of claim 1, wherein the at least one removable device is a networking device.

6. The apparatus of claim 1, wherein the base remains in the first mechanical orientation when the apparatus is in the second mechanical orientation.

7. The apparatus of claim 1, further comprising a temperature sensing device for activating the cooling device.

8. The apparatus of claim 1, wherein the interface includes at least one repositionable connector for varying a position of the at least one removable device in the second mechanical orientation.

9. A method comprising the steps of:
positioning an apparatus in a first mechanical orientation, the apparatus including a housing portion and a base portion;
providing cooling by a cooling device in the apparatus for a signal processing circuit in the first mechanical orientation, the signal processing circuit located in the housing portion of the apparatus, the cooling provided through a duct in the base portion and a first duct in the housing portion that are coupled to direct air flow from the base portion to the housing portion in the first mechanical orientation;
positioning the apparatus in a second mechanical orientation, the second mechanical orientation having the housing portion orthogonal to the mechanical orientation of the housing portion in the first mechanical orientation;
coupling at least one of a plurality of removable modules to the apparatus when the apparatus is positioned in the second mechanical orientation; and
providing cooling for the at least one of the removable modules in the second mechanical orientation, the cooling provided through the duct in the base portion and a second duct and the first duct in the housing portion that are coupled to direct air flow from the base portion to the housing portion in the second mechanical orientation.

10. The method of claim 9, further comprising processing a data signal received by the apparatus using the signal processing circuit.

11. The method of claim 9, wherein the orientation of the housing portion in the first mechanical orientation is a horizontal mechanical orientation.

12. The method of claim 9, wherein the plurality of removable devices are a plurality of hard disk drives.

13. The method of claim 12, wherein the plurality of hard disk drives are configured in a redundant array of inexpensive disks (RAID) configuration.

14. The method of claim 9, wherein the plurality of removable devices are a plurality of networking devices.

15. The method of claim 9, wherein the base portion of the apparatus remains in the first mechanical orientation when the apparatus is in the second mechanical orientation.

16. The method of claim 9, further comprising varying a position of at least one removable device in the second mechanical orientation.

17. An apparatus comprising:
means for housing a signal processing circuit, the circuit processing a signal received by the apparatus;
means for interfacing at least one removable module to the signal processing circuit, the interfacing means being disposed on a surface of the housing means;
means for supporting the housing means in at least two orientations, wherein the apparatus operates in a first mechanical orientation without the at least one removable module coupled to the interfacing means and operates in a second mechanical orientation with the at least one removable module coupled to the interfacing means, the orientation of the housing means in the first mechanical orientation being orthogonal to the orientation of the housing means in the second mechanical orientation; and
means for providing cooling to the signal processing circuit in the housing means through a duct in the supporting means and a first duct in the housing means that are coupled to direct air flow from the supporting means to the housing means in the first mechanical orientation and for providing cooling to the at least one removable module through the duct in the supporting means and a second duct and the first duct in the housing means that are coupled to direct air flow from the supporting means to the housing means in the second mechanical orientation.

18. The apparatus of claim 17, wherein the means for providing cooling is disposed in the supporting means.

19. The apparatus of claim 17, wherein the means for providing cooling is adjusted based on whether the apparatus is in the first mechanical orientation or the second mechanical orientation.

20. The apparatus of claim 17, wherein the cooling means is adjusted based on the at least one removable module.

* * * * *